United States Patent
Lee et al.

(10) Patent No.: US 10,397,562 B2
(45) Date of Patent: Aug. 27, 2019

(54) 4D PLATFORM FOR HOME USE AND 4D SYSTEM FOR HOME USE

(71) Applicants: FOURREAL CO., LTD.; DONGSHIN UNIVERSITY INDUSTRY-ACADEMY COOPERATION, Naju-si, Jeollanam-do (KR)

(72) Inventors: Seok Hoon Lee, Seoul (KR); Sung Yeon Cho, Incheon (KR); Ki Won Kim, Seoul (KR); Sugaco Akiyama, Seoul (KR); Soon Chul Kwon, Seoul (KR); Gi Taek Hur, Gwangju (KR); Hyun Chul Lee, Gwangju (KR); Sang Tae Ha, Gwangju (KR); In Ju Park, Jeonju-si (KR)

(73) Assignees: FOURREAL CO., LTD., Seoul (KR); DONGSHIN UNIVERSITY INDUSTRY-ACADEMY COOPERATION, Naju-si (KR)

( * ) Notice: Subject to any disclaimer, the term of this patent is extended or adjusted under 35 U.S.C. 154(b) by 0 days.

(21) Appl. No.: 15/579,794

(22) PCT Filed: May 26, 2016

(86) PCT No.: PCT/KR2016/005573
§ 371 (c)(1),
(2) Date: May 8, 2018

(87) PCT Pub. No.: WO2016/195319
PCT Pub. Date: Dec. 8, 2016

(65) Prior Publication Data
US 2018/0295354 A1  Oct. 11, 2018

(30) Foreign Application Priority Data

Jun. 5, 2015 (KR) ........................ 10-2015-0080151

(51) Int. Cl.
*H04N 13/398* (2018.01)
*A63J 15/00* (2006.01)
(Continued)

(52) U.S. Cl.
CPC .............. *H04N 13/398* (2018.05); *A63J 5/00* (2013.01); *A63J 25/00* (2013.01); *H04N 5/222* (2013.01);
(Continued)

(58) Field of Classification Search
None
See application file for complete search history.

(56) References Cited

FOREIGN PATENT DOCUMENTS

JP     2004-135789 A       5/2004
JP     2004135789    *     5/2004
(Continued)

OTHER PUBLICATIONS

International Search Report dated Aug. 23, 2016, issued to International Application No. PCT/KR2016/005573.

*Primary Examiner* — Christopher Braniff
(74) *Attorney, Agent, or Firm* — Stein IP, LLC

(57) ABSTRACT

The present invention provides a 4D platform for home use and a 4D system for home use, which have a compact structure allowing the same to be easily connected to a TV monitor and comprise a physical sensation effect execution unit for providing a physical sensation effect according to each scene of an image.

7 Claims, 6 Drawing Sheets

(51) Int. Cl.
*A63J 25/00* (2009.01)
*H04N 13/30* (2018.01)
*H04N 5/222* (2006.01)
*A63J 5/00* (2006.01)

(52) U.S. Cl.
CPC ........ *H04N 13/30* (2018.05); *A63J 2005/005* (2013.01); *A63J 2005/007* (2013.01); *H04N 2213/001* (2013.01)

(56) References Cited

FOREIGN PATENT DOCUMENTS

| KR | 10-2010-0114858 A | 10/2010 |
| KR | 10-2011-0139614 A | 12/2011 |
| KR | 10-2012-0105788 A | 9/2012 |
| KR | 20120105788 * | 9/2012 |
| KR | 10-2013-0053504 A | 5/2013 |

* cited by examiner

[FIG. 1]
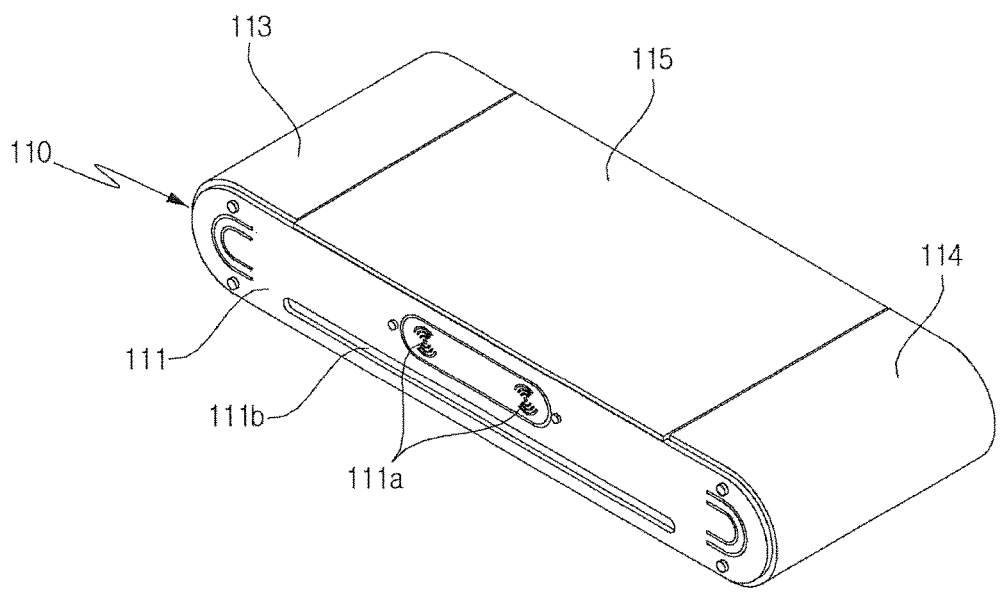

[FIG. 2]
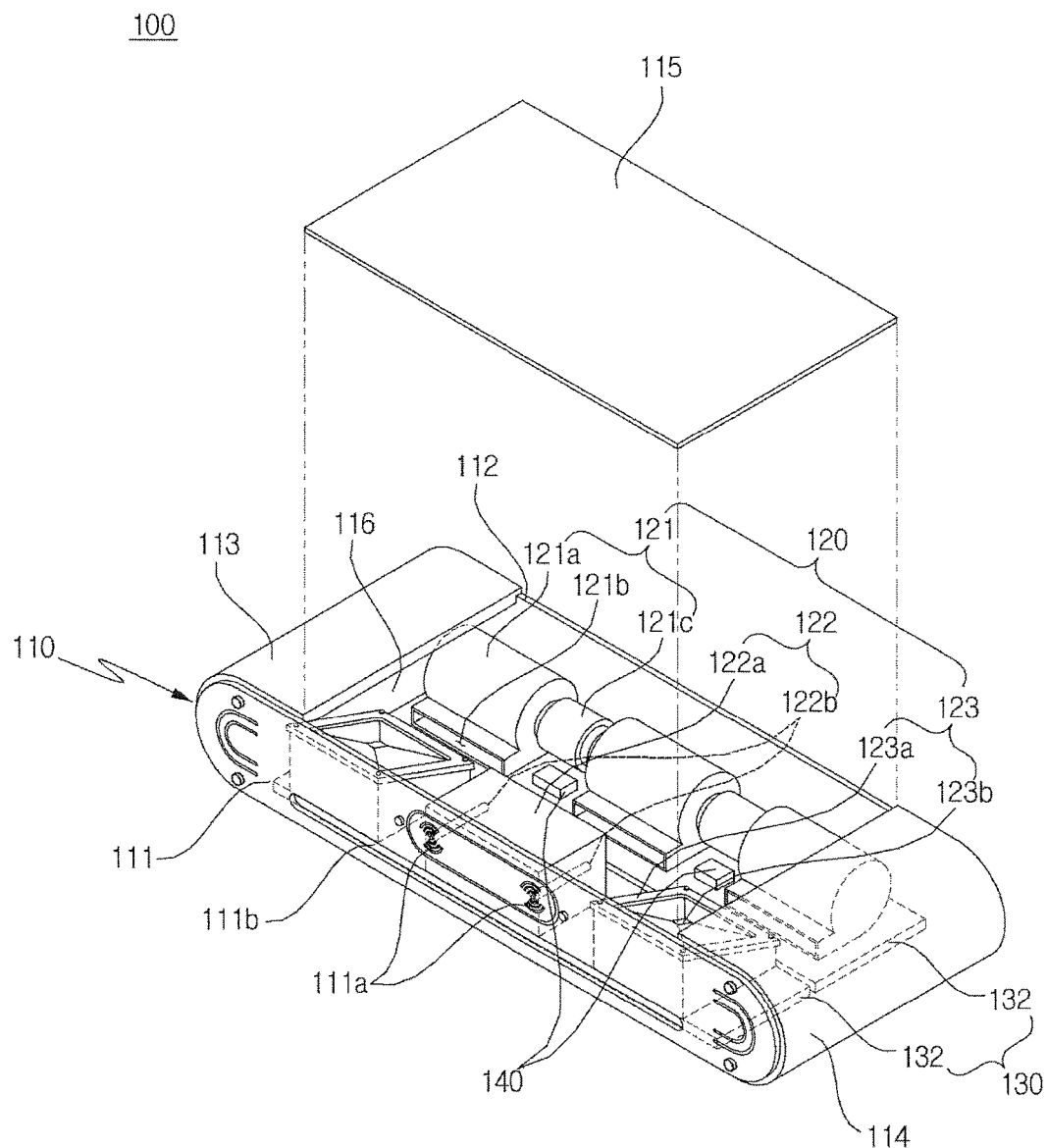

[FIG. 3]
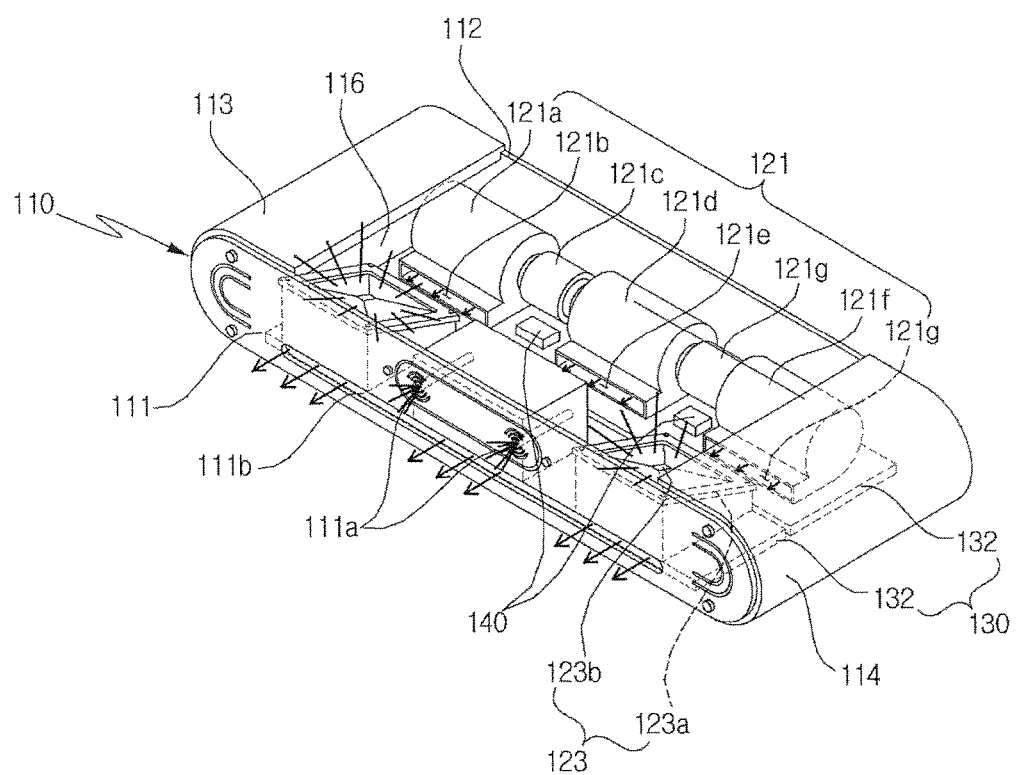

[FIG. 4]
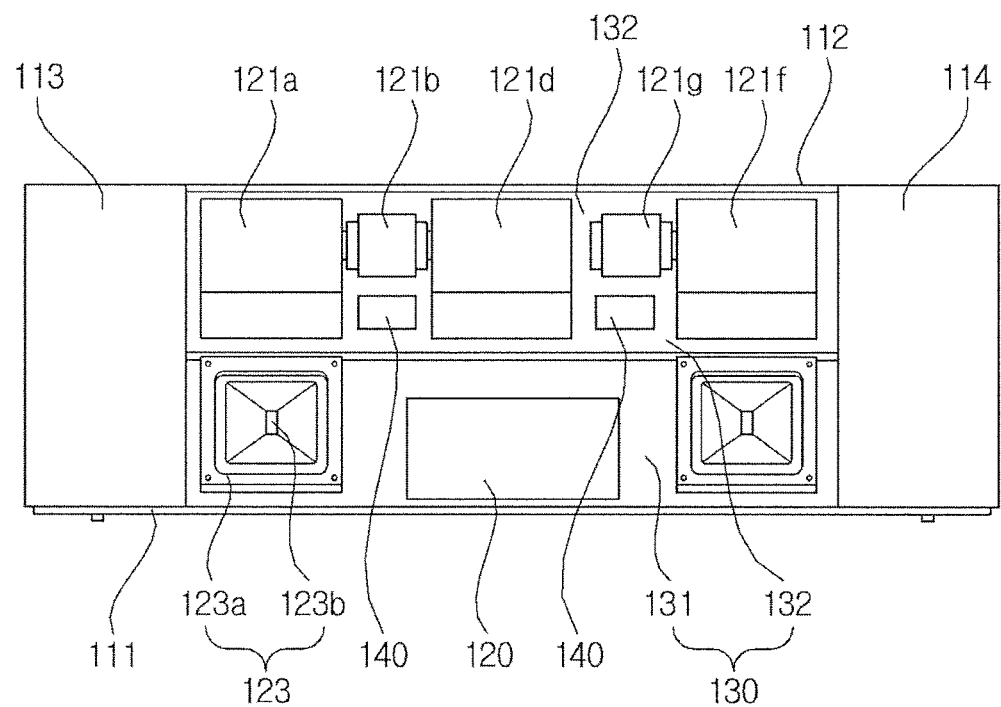

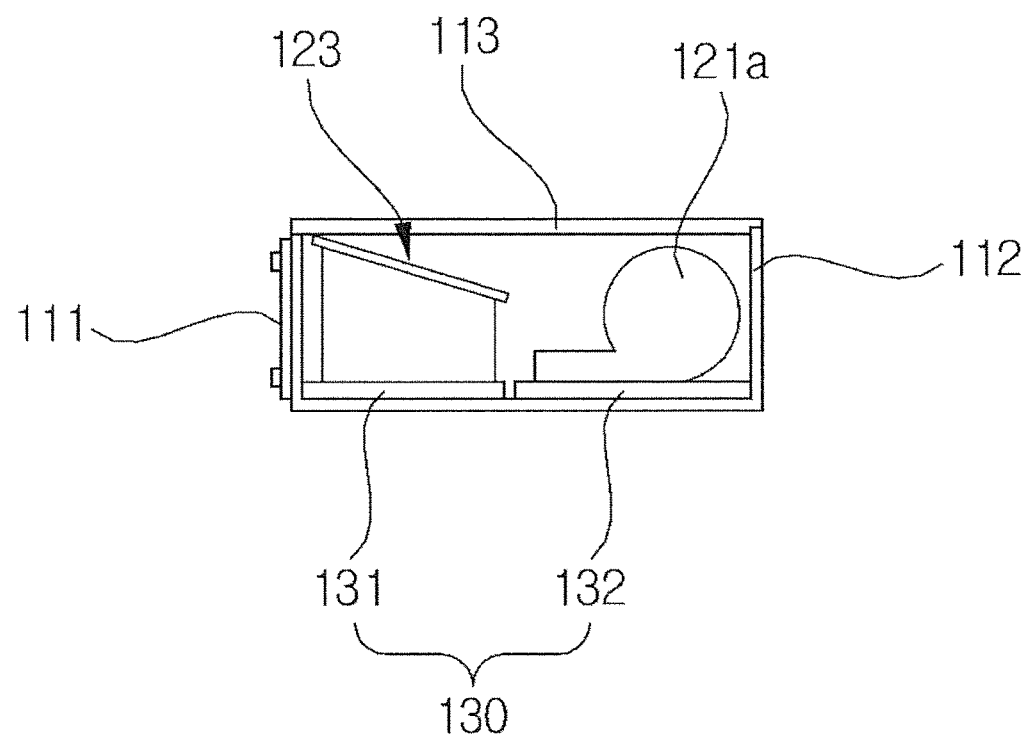
[FIG. 5]

[FIG. 6]
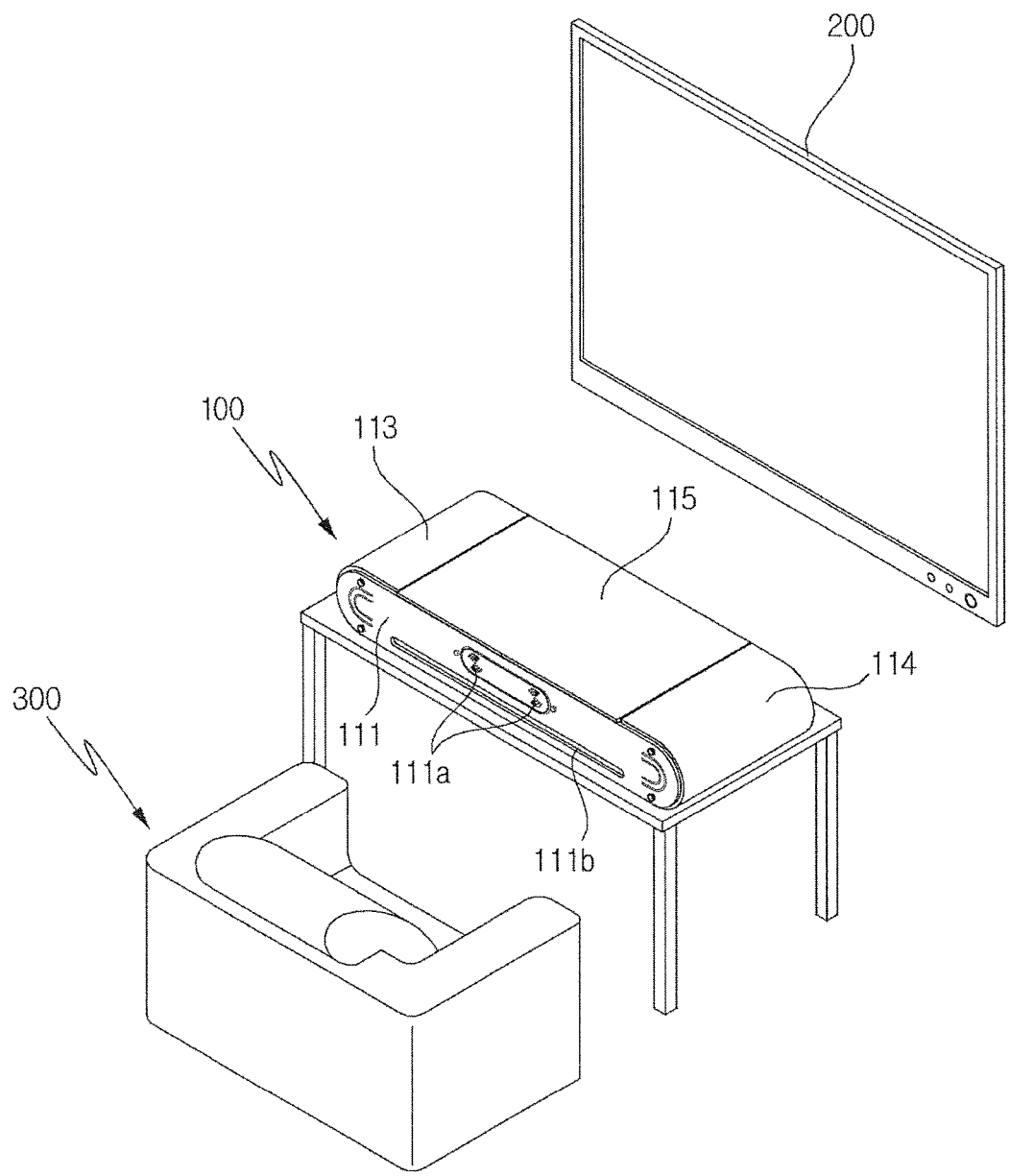

4D PLATFORM FOR HOME USE AND 4D SYSTEM FOR HOME USE

CROSS-REFERENCE TO RELATED APPLICATIONS

This application is a national stage of International Application No. PCT/KR2016/005573, filed May 26, 2016, which claims the benefit of priority to Korean Application No. 10-2015-0080151, filed Jun. 5, 2015 in the Korean Intellectual Property Office, the disclosures of which are incorporated herein by reference.

TECHNICAL FIELD

The present invention relates to a home 4D platform and a home 4D system, and more particularly, to a home 4D platform and a home 4D system having a compact structure capable of being easily connected to a TV monitor and including a physical feeling effect execution unit for providing physical feeling effects according to each scene of video images.

BACKGROUND ART

Recently, by use of stereoscopic filming equipment when shooting movies, 2D movies as well as 3D stereoscopic movies, which have the same contents as 2D movies but of which reality is further augmented, have been released simultaneously, and accordingly there emerge stereoscopic theaters specialized in illustrating 3D movies. Also, there appear theaters adopting 4D chairs, equipped with vibration devices, to be vibrated by automatic control according to middle and low-pitched sound in the movie, thereby providing a more profound audio experience to the audiences. Furthermore, in order to make the audiences feel, although limited, a sense of reality more, it has been proposed that a method for embedding various special effect signals in video signals of the movie such that the special effects are generated according to the video signals to stimulate the audiences' sense of smell, thereby providing an environment where the audiences can be immersed in the movie more.

Generally, what is visible to human eyes is a 3D stereoscopic image, but when an image taken by using a camera or camcorder is displayed on a TV, monitor or theater screen, the image is flat two-dimensional, so it is a fact that a three-dimensional effect thereof become greatly deteriorated.

Considering this, when audiences are watching a movie in chairs of a theater, an event hall of an amusement park or a 3D theater, there have been recently suggested physical interactive chairs equipped with devices for experiencing special effects in order for the audiences to indirectly experience various situations of video images Usually, theaters are largely divided into first-run theaters for illustrating general movies, special movie theaters installed in places for amusement, such as theme parks, and exhibition movie theaters for purposes of education and advertisement, such as museums, public relations centers, and business exhibition halls.

Also, value or fun of movies including film dramas and documentary films, which are shown in most of theaters are evaluated by degree of completion of the films or movies, namely, scenarios in which writers' ideas are expressed, the level of planning, acting ability of actors, appropriate sets and screen composition, etc. In most cases, because a movie transfers its content to the audiences by utilizing only sight and hearing out of the human five senses, a chance that each of the audiences becomes a main character of the movie such that the audiences can be immersed in the movie more and interact in the movie by participating in and reacting to the movie has been extremely limited.

In the meantime, recently, with a spread of digital media capable of two-way communication of signals and with restoration of the movie industry, a possibility of a new type of the movie market is cautiously on the rise.

By use of stereoscopic filming equipment when shooting movies, 2D movies as well as 3D stereoscopic movies, which have the same contents as 2D movies but of which reality is further augmented, have been released simultaneously, and there emerge stereoscopic theaters specialized in illustrating 3D movies. Also, there appear theaters adopting 4D chairs, equipped with vibration devices, to be vibrated by automatic control according to middle and low-pitched sound in the movie, thereby providing a more profound audio experience to the audiences.

Also, in the case of exhibition and promotional video proposals displayed in museums and corporate exhibition halls, etc., rather than composing a list type of contents for mainly conveying facts in the form of a documentary, there are increasing cases of composing image systems that drama films which appropriately utilize stereoscopic or graphic special visual effects through scenarios are composed in order that audiences can be immersed in the video and naturally obtain knowledge after watching the video.

Therefore, in order to reflect the psychology of modern people who want unique and various experiences different from the conventional means that mainly depend on sight alone, there is a trend of the need for studying how to have audiences watch video images with more fun so that the audiences can be immersed in the video images by providing environment effects similar to the visual content or by surprising the audiences through the sense of touch among the human five senses, namely, by simply stimulating the bodies of the audiences to a degree not to offend the audiences Additionally, efforts to effectively transfer the messages that the video images have to the audiences have been in progress from various angles.

However, since the physical interactive imaging systems as described above are installed on a large scale in theaters or museums, audiences are burdened to go directly theaters or museums in order to experience 4D.

Therefore, in some households, development of a system capable of providing 4D physical feeling effects is required.

(Patent Document 1) KR Patent No. 10-1005320 B1

DISCLOSURE

Technical Object

The technical object of the present invention to solve the above problems is to provide a home 4D platform and a home 4D system for enhancing 4D physical feeling effects by spraying water as mist to the user through a spray unit mounted on the inside of a front side portion according to each scene of video images.

Also, another object of the present invention is to provide a home 4D system and a home 4D system for increasing 4D physical feeling effects to the user by flickering light in a backward and upward diagonal direction through a light unit disposed on opposite sides of a spray unit according to each scene of video images.

Also, the further object of the present invention is to provide a home 4D platform and a home 4D system for doubling 4D physical feeling effects by providing wind to the user in a forward direction through a blower disposed behind the light unit according to each scene of video images In addition, the still further another object of the present invention is to provide a home 4D platform and a home 4D system which can be assembled and disassembled into respective parts by designing an outer casing comprised of a front side portion, a rear side portion, a left side portion, a rear side portion, a top side portion and a bottom side portion.

Technical Solution

In order to achieve the technical object, a home 4D platform according to an embodiment of the present invention includes: an outer casing; a physical feeling effect execution unit disposed in the outer casing; a support, fixed to an inner bottom surface of the outer casing, for supporting the physical feeling effect execution unit; and a control unit, electrically connected to the physical feeling effect executing unit, for controlling operation of the physical feeling effect executing unit, wherein the physical feeling effect executing unit includes: a blower unit for blowing wind to a front of the outer casing; a spray unit for spraying water as mist to a front of the outer casing in sync with each scene of video images; and a light unit for flickering light to a rear of the outer casing unit.

Here, in an embodiment of the present invention, the outer casing includes: a track-shaped front side portion; a track-shaped rear side portion disposed to face the front side portion; a left side portion, formed on one side of the front side portion and the rear side portion, for connecting the front side portion and the rear side portion; a right side portion, formed on the other side of the front side portion and the rear side portion to face the left side portion, for connecting the front side portion and the rear side portion; a top side portion surrounding one side of the left side portion and the right side portion; and a bottom side portion positioned to face the top side portion, wherein a plurality of mist holes for spraying water as mist are formed in a central portion of the front side portion; and wherein a blowhole is formed in a lower portion of the top side portion adjacent to the mist spray holes.

Here, in an embodiment of the present invention, the blower unit includes: a case; a blower fan rotatable in a predetermined space provided in the case; and a motor connected to the blower fan, wherein the motor generates wind while rotating and then blows the wind to a case hole formed in the case, whereby the wind blown into the case hole is then blown out through the blowhole.

Here, in an embodiment of the present invention, the spray unit includes: a spray box disposed inside the front side portion; and at least one spray nozzle disposed in the spray box to face a front of the front side portion, wherein the spray nozzles are disposed to correspond to the mist spray holes, so that the spray nozzles can spray water as mist toward the mist spray holes.

Here, in an embodiment of the present invention, the light unit includes: a housing, the upper surface of which is an inclined surface; and a light member disposed on the inclined surface, wherein the light unit is disposed on opposite sides of the spray unit and irradiates light toward the top side portion and the rear side portion, and wherein the inclined surface and the bottom side portion form an acute angle.

Here, in an embodiment of the present invention, the light member irradiates light obliquely toward the top side portion.

In order to achieve the technical object, a home 4D system according to an embodiment of the present invention includes: a home 4D platform for providing light, mist spray and wind; a display unit for displaying video images; and a physical interactive unit, the position of which changes according to each scene of the video images, wherein the home 4D platform provides at least one of light, mist, and wind according to each scene of the video images displayed on the display unit.

Advantageous Effects

Advantageous effects of the home 4D platform and the home 4D system according to the present invention as described above will be described as follows.

First, according to the present invention, water is sprayed as mist to the user through the spray unit mounted on the inside of the front side portion according to each scene of video images, thereby providing an advantage effect of realistic 4D physical feeling effects to the user as if the user becomes a main character in the movie.

Also, according to the present invention, there is an advantageous effect of increasing 4D physical feeling effects to the user by flickering light in a backward and upward diagonal direction through the light unit disposed on opposite sides of the spray unit according to each scene of video images.

Also, according to the present invention, there is an advantageous effect of doubling realistic physical feeling effects by providing wind to the user in a forward direction through a blower disposed behind the light unit according to each scene of video images.

In addition, according to the present invention, there is an advantageous effect in that an outer casing can be assembled and disassembled into respective parts by designing the outer casing comprised of a front side portion, a rear side portion, a left side portion, a rear side portion, a top side portion and a bottom side portion in a compact structure, so that the outer casing can be easily installed and used in the home.

It should be understood that the advantageous effects of the present invention are not limited thereto as described above, but include all effects that can be deduced from the detailed description of the present invention or the constitution of the invention described in the claims.

BRIEF DESCRIPTION OF THE DRAWINGS

FIG. 1 is perspective view in one direction illustrating a home 4D platform according to an embodiment of the present invention.

FIG. 2 is a perspective view in one direction illustrating a physical feeling effect execution unit and a support disposed in the home 4D platform in a state in which only a top side portion is disassembled in FIG. 1.

FIG. 3 is a perspective view in one direction illustrating physical feeling effects of the home 4D platform according to the embodiment of the present invention.

FIG. 4 is a plan view of FIG. 2 except the top side portion.

FIG. 5 is a right side view of FIG. 4 except the right side portion.

FIG. 6 is a perspective view in one direction illustrating a home 4D system according to an embodiment of the present invention.

DESCRIPTION OF EXEMPLARY EMBODIMENTS

Hereinafter, the present invention will be described with reference to the accompanying drawings. However, the present invention may be modified in various different ways and should not be construed as limited to the embodiments set forth herein. Also, in order to clearly describe the present invention, parts not related to the description are omitted, and like parts are denoted by like reference numerals throughout the specification.

Throughout the specification, when a part is referred to as being "connected" to another part, it includes not only "directly connected" but also includes "indirectly connected" where the other member is interposed therebetween. Also, unless explicitly described to the contrary, the word "comprise" will be understood to imply the inclusion of stated elements but not the exclusion of any other elements.

Hereinafter, embodiments of the present invention will be described in detail with reference to the accompanying drawings.

FIG. 1 is perspective view in one direction illustrating a home 4D platform according to an embodiment of the present invention, and FIG. 2 is a perspective view in one direction illustrating a physical feeling effect execution unit and a support disposed in the home 4D platform in a state in which only a top side portion is disassembled in FIG. 1.

The home 4D platform 100 according to an embodiment of the present invention includes an outer casing 110; a physical feeling effect execution unit 120 disposed in the outer casing 110; a support 130, fixed on an inner bottom surface of the outer casing 110, for supporting the physical feeling effect execution unit 120; and a control unit 140, electrically connected to the physical feeling effect execution unit 120, for controlling operation of the physical feeling effect execution unit 120

The outer casing 110 includes a track-shaped front side portion 111; a track-shaped rear side portion 112 disposed to face the front side portion 111; a left side portion 113, formed on one side of the front side portion 111 and the rear side portion 112, for connecting the front side portion 111 and the rear side portion 112; a right side portion 114, formed on the other side of the front side portion 111 and the rear side portion 112 to face the left side portion 113, for connecting the front side portion 111 and the rear side portion 112; a top side portion 115 surrounding one side of the left side portion 113 and the right side portion 114; and a bottom side portion 116 positioned to face the top side portion 115.

The front side portion 111 is a track-shaped plate member, and it is preferable that the front side portion 111 is made of acrylic material having a light weight and a rigidity higher than a predetermined level for easy carrying, but is not limited thereto. The front side portion 111 includes a mist spray hole 111a and a blowhole 111b.

The mist spray hole 111a is formed in a central portion of the front side portion 111 as a plurality of mist holes for spraying water as mist. More specifically, the mist spray holes 111a are in the shape of vertically symmetrical arcs, and as shown in FIG. 2, are formed on the left and right sides of the center portion of the front side portion 111, respectively.

The blowhole 111b is formed long in the longitudinal direction of the front side portion 111 so that wind can pass through the lower portion of the front side portion 111 adjacent to the mist spray holes 111a.

The mist spray holes 111a and the blowhole 111b are for providing 4D physical feeling effects to a user who is seated on a physical interactive unit 300 which will be described later. The angle between the mist spray holes 111a and the air blowhole 111b may be changed depending on the position where wind and water to be spayed as mist to the user are provided.

In addition, if necessary, a separate actuator (not shown) may be provided on the bottom side portion 116 adjacent to the front side portion 111 to change the position of effect provided to the user by adjusting the height of the separate actuator.

The rear side portion 112 is in the shape of a track disposed in parallel with the front side portion 111 and has the same shape as the front side portion 111 as described above but separate mist spray holes 111a and a blowhole 111b as the front side portion 111 are not formed.

The left side portion 113 is a U-shaped plate member formed on one side of the front side portion 111 and the rear side portion 112 and connecting the front side portion 111 and the rear side portion 112.

The right-side portion 114 is a U-shaped plate member formed on the other side of the front side portion 111 and the rear side portion 112 to face the left side portion 113, connecting the front side portion 111 and the rear side portion 112 and having the same shape as the left side portion 113 as described above.

The top side portion 115 is a rectangular plate member detachable and attachable in the vertical direction of the rear side portion 111, the left side portion 113 and the right side portion 114, and opposite sides of the top side portion 115 are attached to and surround the upper surfaces of the left side portion 113 and the right side portion 114.

The bottom side portion 116 is a rectangular plate member positioned to face the top side portion 111 and supporting the lower portions of the rear side portion 112, the left side portion 113, and the right side portion 114.

In consideration of the fact that the home 4D platform 100 according to the embodiment of the present invention is for home use, it is preferable that the outer casing unit 110 as described above is designed to improve portability, to facilitate disassembly and assembly, and to select a material corresponding thereto.

FIG. 3 is a perspective view in one direction illustrating physical feeling effects of the home 4D platform according to the embodiment of the present invention, FIG. 4 is a plan view of FIG. 2 except the top side portion, and FIG. 5 is a right side view of FIG. 4 except the right side portion.

The physical feeling effect execution unit 120 is configured to execute one of the effects such as spraying water as mist to the front of the outer casing unit 110, flickering light to the rear of the outer casing unit 110, and blowing wind to the front of the outer casing unit 110 in sync with each scene of video images, and includes a blower unit 121, a spray unit 122 and a light unit.

The blower unit 121 blows wind to the front of the outer casing unit 110. The blower unit 121 includes cases 121a, 121d and 121f; blower fans (not shown) rotatable in predetermined spaces provided in the cases 121a, 121d and 121f; and motors 121c and 121h connected to the blower fans.

The blower unit 121 includes a first case 121a, a first case hole 121b, a first motor 121c, a second case 121d, a second case hole 121e, a third case 121f, a third case hole 121g, and a second motor 121h.

The cases 121a, 121d and 121f are a first case 121a, a second case 121d and a third case 121f, respectively in which predetermined spaces are provided. so that blower fans (not shown) connected to the motors 121c and 121h can be rotated therein.

The motors 121c and 121h are a first motor 121c and a second motor 121h and generate and then blow wind to case holes 121b and 121e and 121g formed in the cases 121a, 121d and 121f.

More specifically, the first motor 121c is connected the blower fan located in the first case 121a and the second case 121d, thereby generating wind in the first case 121a and the second case 121d.

On the other hand, the second motor 121h is connected to only the blower fan located in the third case 121f, thereby generating wind in the third case 121f.

Here, the case holes 121b, 121e, and 121g include a first case hole 121b formed in the first case 121a, a second case hole 121e formed in the second case 121d, and a third case hole 121g formed in the third case 121f.

The wind blown into the case holes 121b, 121e and 121g in accordance with the rotations of the first motor 121c and the second motor 121h is then blown out through the blowhole 111b.

The spray unit 122 spray water as mist to the front of the outer casing unit 110 in sync with each scene of video images.

More specifically, the spray unit 122 includes a spray box 122a disposed inside the front side portion 111 and at least one spray nozzle 122b disposed in the spray box 122a to face the front of the front side portion 111.

The spray box 122a has a hexahedral shape disposed on the inner surface of the front side portion 111, and the spray nozzle 122b is accommodated therein. In addition, although not shown in the present invention, a flow control valve (not shown) in communication with through the spray nozzle 122b may be further included in the spray box 122a to control the flow rate of water being sprayed as mist. Here, although the water being supplied is not shown in the present invention, a separate water tank (not shown) may be provided to supply water to the spray nozzle 122b.

The spray nozzle 122b may be at least one such as a pair as shown in FIG. 2, but the number of the spray nozzles 122b is not limited thereto. The spray nozzles 122b may be disposed to correspond to the mist spray holes 111a, so that the spray nozzles 122b can spray water as mist toward the mist spray holes 111a.

The light unit 123 flickers light to the rear of the outer casing unit 110. The light unit 123 includes a housing 123a, the upper surface of which is an inclined surface, and a light member 123b disposed on the inclined surface.

More specifically, the light unit 123 is disposed on opposite sides of the spray box 122a and irradiates light toward the top side portion 115 and the rear side portion 112. The light unit 123 includes a housing 123a and a light member 123b.

As shown in FIG. 2, the housing 123a has a triangular prism shape, the upper surface of which is an inclined upper surface disposed to face between the top side portion 115 and the rear side portion 112.

The light member 123b is disposed on the inclined surface and irradiates light obliquely toward the top side portion 115. Here, the inclined surface and the bottom side portion 116 form an acute angle, which is to prevent the user's glare as the light is irradiated in the direction opposite to the direction in which the user is positioned, and to provide more dramatic physical feeling effects through the backlight effect.

More specifically, the light member 123b irradiates light between the top side portion 115 and the rear side portion 112.

The support 130 includes a first support member 131 and a second support member 132.

The first support member 131 is a plate member, fixed to the upper portion of the bottom side portion 116 adjacent to the front side portion 111, for supporting the spray unit 122 and the pair of light units 123.

The second support member 132 is a plate member, fixed to the upper portion of the bottom side portion 116 adjacent to the rear side portion 112, for supporting the blower unit 121 and the control unit 140.

The control unit 140 is electrically connected to the physical feeling effect execution unit 120 to control the operation of the physical feeling effect execution unit 120.

More specifically, the control unit 140 adjusts the on/off and rotation speeds of the first motor 121c and the second motor 121h, controls the on/off and intensity of the light member 123b and adjusts the spray amount of water injected into the nozzle 122b.

That is, the control unit 140 controls at least one operation of the first motor 121c, the second motor 121h, the spray nozzle 122b and the light member 123b in each of the scenes that can dramatically provide physical feeling effects during the displaying of video images, thereby providing the user with various physical feeling effects.

For example, when the screen is changed suddenly, when a scene that is physically impacted from the outside is generated, etc., the controlling of the control unit 140 is started.

Hereinafter, a home 4D system 500 according to an embodiment of the present invention will be described with reference to FIG. 6, and the home 4D platform 100 will be described with reference the above description.

FIG. 6 is a perspective view in one direction illustrating a home 4D system according to an embodiment of the present invention.

The home 4D system 500 according to an embodiment of the present invention includes a home 4D platform 100 for providing light, mist spray and wind; a display unit 200 for displaying video images; and a physical interactive unit 300, the position of which changes according to each scene of the video images.

The home 4D platform 100 provides at least one of light, mist, and wind according to each scene of the video images displayed on the display unit 200.

The display unit 200 is a device for displaying video images displayed on a TV or reproduced by a CD or a DVD, etc., and is preferably a general TV monitor.

The physical interactive unit 300 is a physical interactive chair which is disposed to be spaced apart from the display unit 200 for the user to watch video images provided by the display unit 200 and can be seated by the user.

The physical interactive chair can move up and down by the actuator in a state that the user is seated. These physical feeling effects of the physical interactive chair can include movements according to each scene of the video images provided by the display unit 200.

In addition, the home 4D system 500 according to the embodiment of the present invention may further include an operation unit. The present invention enables the user not only to experience physical feeling effects while watching video images, but also to execute a game. When the game is executed, the operation unit at this time corresponds to a controller that allows the user to enjoy the game.

That is, when the game is executed, the physical feeling effects from the home 4D platform 100 and the physical interactive unit 300 according to the present invention are experienced as described above.

It will be understood by a person with ordinary skill in the art that the above-mentioned description of the present invention is for the purpose of illustration only, and that various changes in other specific forms may be made easily without departing from the technical ideas or essential features of the present invention. It is therefore to be understood that the above described embodiments are illustrative in all aspects and not restrictive. For example, each component described as a single type may be implemented as being distributed and components described as being distributed may also be implemented as being combined.

The scope of the present invention is to be defined by the claims that will be described later, and all changes or modifications derived from the meaning and scope of the claims and their equivalents should be construed as being included within the scope of the present invention.

DESCRIPTION OF SYMBOLS

100: 4D platform 110: outer casing
111: front side portion 111a: mist spray hole
111b: blowhole 112: rear side portion
113: left side portion 114: right side portion
115: top side portion 116: bottom side portion
120: physical feeling effect execution unit 121: blower unit
121a: first case 121b: first case hole
121c: first motor 121d: second case
121e: second case hole 121f: third case
121g: third case hole 121h: second motor
122: spray unit 122a: spray box
122b: spray nozzle 123: light unit
123a: housing 123b: light member
130: support 131: first support member
132: second support member 140: control unit
200: display unit 300: physical interactive unit
500: 4D system

What is claimed is:

1. A home four-dimensional (4D) platform comprising:
an outer casing;
a physical feeling effect execution unit disposed in the outer casing;
a support, fixed to an inner bottom surface of the outer casing, for supporting the physical feeling effect execution unit; and
a control unit, electrically connected to the physical feeling effect executing unit, for controlling operation of the physical feeling effect executing unit,
wherein the physical feeling effect executing unit comprises:
a blower unit for blowing wind to a front of the outer casing;
a spray unit for spraying water as mist to a front of the outer casing in sync with each scene of video images; and
a light unit for flickering light to a rear of the outer casing,
wherein the outer casing comprises a track-shaped front side portion, and
wherein a plurality of mist holes for spraying water as mist are formed in a central portion of the front side portion.

2. The home 4D platform of claim 1, wherein the outer casing comprises: a track-shaped rear side portion disposed to face the front side portion; a left side portion, formed on one side of the front side portion and the rear side portion, for connecting the front side portion and the rear side portion; a right side portion, formed on the other side of the front side portion and the rear side portion to face the left side portion, for connecting the front side portion and the rear side portion; a top side portion surrounding one side of the left side portion and the right side portion; and a bottom side portion positioned to face the top side portion, and
wherein a blowhole is formed in a lower portion of the top front portion adjacent to the mist spray holes.

3. The home 4D platform of claim 2, wherein the blower unit comprises: a case; a blower fan rotatable in a predetermined space provided in the case; and a motor connected to the blower fan, and
wherein the motor generates wind while rotating and then blows the wind to a case hole formed in the case,
whereby the wind blown into the case hole is then blown out through the blowhole.

4. The home 4D platform of claim 2, wherein the spray unit comprises: a spray box disposed inside the front side portion; and at least one spray nozzle disposed in the spray box to face a front of the front side portion, and
wherein the spray nozzles are disposed to correspond to the mist spray holes, so that the spray nozzles can spray water as mist toward the mist spray holes.

5. The home 4D platform of claim 2, wherein the light unit comprises: a housing, the upper surface of which is an inclined surface; and a light member disposed on the inclined surface,
wherein the light unit is disposed on opposite sides of the spray unit and irradiates light toward the top side portion and the rear side portion, and
wherein the inclined surface and the bottom side portion form an acute angle.

6. The home 4D platform of claim 5, wherein the light member irradiates light obliquely toward the top side portion.

7. A home four-dimensional (4D) system comprising:
the home four-dimensional (4D) platform of claim 1 for providing light, mist spray and wind;
a display unit for displaying video images; and
a physical interactive unit, the position of which changes according to each scene of the video images,
wherein the home 4D platform provides at least one of light, mist, and wind according to each scene of the video images displayed on the display unit.

* * * * *